United States Patent
Chen et al.

(10) Patent No.: US 7,745,243 B2
(45) Date of Patent: Jun. 29, 2010

(54) METHOD FOR FORMING PIXEL STRUCTURE OF TRANSFLECTIVE LIQUID CRYSTAL DISPLAY

(75) Inventors: Yu-Cheng Chen, Hsin-Chu (TW);
Chen-Yueh Li, Hsin-Chu (TW);
Ching-Sang Chuang, Hsin-Chu (TW);
Kun-Chih Lin, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 0 days.

(21) Appl. No.: 12/416,934

(22) Filed: Apr. 2, 2009

(65) Prior Publication Data
US 2010/0112737 A1    May 6, 2010

(30) Foreign Application Priority Data
Nov. 3, 2008    (TW) .............................. 97142340 A

(51) Int. Cl.
*H01L 21/8232* (2006.01)
(52) U.S. Cl. ........................ 438/30; 438/587; 438/592; 257/E33.064; 257/E33.068
(58) Field of Classification Search ................. 438/30, 438/587, 592, FOR. 201; 257/E33.064, E33.068
See application file for complete search history.

(56) References Cited

U.S. PATENT DOCUMENTS

| | | | |
|---|---|---|---|
| 6,949,767 B2 | 9/2005 | Yamazaki | |
| 7,256,060 B2 | 8/2007 | Park | |
| 7,528,909 B2 * | 5/2009 | Ahn et al. | ................... 349/114 |
| 2005/0140869 A1 | 6/2005 | Yang et al. | |
| 2005/0140892 A1 | 6/2005 | Kim et al. | |
| 2007/0013840 A1 | 1/2007 | Baek | |
| 2009/0181485 A1 * | 7/2009 | Baik et al. | ..................... 438/46 |
| 2009/0302318 A1 * | 12/2009 | Chang | ......................... 257/59 |

* cited by examiner

*Primary Examiner*—George Fourson
(74) *Attorney, Agent, or Firm*—Winston Hsu

(57) ABSTRACT

A forming method of the present invention includes forming a first patterned conductive layer, which includes a transparent conductive layer and a metal layer stacked together on a substrate, where the first patterned conductive layer functions as gate lines, gate electrodes, common lines and predetermined transparent pixel electrode structures; and forming a second patterned conductive layer on the substrate. The second patterned conductive layer includes data lines and reflective pixel electrodes, and be directly connected to doping regions, such as source regions/drain regions. According to the forming method of the present invention, pixel structures of a transflective liquid crystal display device can be formed through five mask processes. Therefore, the manufacturing process of the transflective liquid crystal display device is effectively simplified, so the product yield is improved and the cost can be reduced.

16 Claims, 16 Drawing Sheets

METHOD FOR FORMING PIXEL STRUCTURE OF TRANSFLECTIVE LIQUID CRYSTAL DISPLAY

BACKGROUND OF THE INVENTION

1. Field of the Invention

The present invention relates to a method for forming a pixel structure, and more particularly, to a method for forming a pixel structure of a transflective liquid crystal display (LCD) device.

2. Description of the Prior Art

Most liquid crystal displays (LCDs) can be categorized into a transmissive type, a reflective type, and a transflective type. The transmissive LCD uses backlight as a source for emitting light. The light emitted by the backlight will pass through the LCD panel to let an observer see the image displayed on the LCD panel. The reflective LCD has a reflective electrode, such as an aluminum electrode. When displaying the image, the ambient light of the reflective LCD will enter the LCD from the observer side of the LCD and then be reflected by the reflective electrode. The reflected light will pass through the surface of the LCD panel again, and finally the observer can see the image displayed on the LCD. The transflective LCD has the characteristic of both transmissive type and reflective type. In other words, each sub-pixel region of the LCD panel comprises a transmission region and a reflection region, where the transmission region uses a backlight as a light source, and the reflection region uses an ambient light as a light source.

Please refer to FIG. 1, which is a schematic diagram of a traditional transflective LCD panel. As shown in FIG. 1, a traditional transflective LCD panel 10 includes an array substrate 20, a color filter substrate 30, and a liquid crystal layer 40 disposed between the array substrate 20 and the color filter substrate 30. The array substrate 20 includes a plurality of pixel regions 22, and each of the pixel regions 22 includes a reflection region 27 and a transmission region 28. For clarity, only one pixel region 22 for example is shown in FIG. 1. The array substrate 20 includes a plurality of thin-film transistors 23 disposed in the reflection regions 27, a plurality of reflective electrodes 24 disposed on the thin-film transistors 23, a dielectric layer 26 disposed between the thin-film transistors 23 and the reflective electrodes 24, and a plurality of transparent pixel electrodes 25 disposed in the transmission regions 28. Both the reflective electrodes 24 and the transparent pixel electrodes 25 are electrically connected to the thin-film transistors 23, so the thin-film transistors 23 can control and drive the pixel electrodes. On other hand, the color filter substrate 30 includes a plurality of color filters 32 disposed corresponding to the pixel regions 22, and a black matrix 34 disposed around the pixel regions 22.

According to processes of forming the traditional transflective LCD device, the traditional method usually takes eight or nine photo mask to define patterns of the elements so as to form a pixel structure of a transflective LCD device. However, every photo mask process for defining patterns should include a plurality of steps, such as deposing, cleaning, lithography, etching, checking, etc, so the processes of forming the traditional transflective LCD device are too complicated. Due to the traditional processes, the output quantity of the LCD devices is quite limited, and it is hard to decrease the cost of forming the traditional transflective LCD device.

SUMMARY OF THE INVENTION

It is therefore an objective of the present invention to provide a method for forming a pixel structure of a transflective LCD device for solving the above-mentioned problems.

According to an embodiment of the present invention, a method for forming a pixel structure of a transflective LCD device is disclosed. The pixel structure is formed on a substrate. The substrate has a pixel region, and the pixel region includes a reflective region and a transmission region. First, a patterned semiconductor layer is formed on the substrate. Subsequently, a first ion implantation process is performed on parts of the patterned semiconductor layer, so as to form a first doping region in the patterned semiconductor layer. Next, a dielectric layer is formed to cover the patterned semiconductor layer on the substrate. Furthermore, a first patterned conductive layer is formed on a surface of the dielectric layer. The first patterned conductive layer consists of a transparent conductive layer and a first metal layer disposed on the transparent conductive layer. The first patterned conductive layer includes a gate line, at least one gate electrode, a common line and a predetermined transparent pixel electrode structure disposed in the transmission region. Next, a second ion implantation process is performed on the patterned semiconductor layer, so as to form a source region and a drain region on two opposite sides of the gate electrode respectively, and to form a doping interface between the drain region and the first doping region. Following that, an inter-layer dielectric (ILD) layer is formed on the substrate. Thereafter, parts of the ILD layer are removed to expose parts of the source region, the doping interface and the first metal layer of the predetermined transparent pixel electrode structure. Next, a second conductive layer is formed on the substrate to cover the ILD layer and to expose a surface of the first metal layer. Thereafter, an etching process is performed to remove parts of the second conductive layer and parts of the first metal layer in the transmission region simultaneously, so as to form a data line and a reflective pixel electrode, to expose the transparent conductive layer of the predetermined transparent pixel electrode structure, and to form a transmission pixel electrode electrically connected to the reflective pixel electrode.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2a to FIG. 8a are top view schematic diagrams illustrating a method of forming a pixel structure of a transflective LCD panel in accordance with one preferred embodiment of the present invention.

FIG. 2b to FIG. 8b are cross-sectional view schematic diagrams along the cross line n-n' shown in FIG. 2a to FIG. 8a.

DETAILED DESCRIPTION

To provide a better understanding of the presented invention, preferred embodiments will be made in details. The preferred embodiments of the present invention are illustrated in the accompanying drawings with numbered elements.

FIG. 2 through FIG. 8 are schematic diagrams illustrating a method of forming a pixel structure of a transflective LCD panel in accordance with one preferred embodiment of the present invention, where FIG. 2a to FIG. 8a are top views, while FIG. 2b to FIG. 8b are cross-sectional views along the cross line n-n' shown in FIG. 2a to FIG. 8a. Like numbered numerals designate similar or the same parts, regions or elements. It is to be understood that the drawings are not drawn to scale and are served only for illustration purposes. For clearly showing the relative position of the elements or device, the gate dielectric layer in FIG. 3a to FIG. 8a and the ILD layer in FIG. 6a to FIG. 8a are drawn as transparent elements. However, it should be understood by those skilled in this art that the gate dielectric layer and the ILD layer should not be limited to transparent materials.

Figure 1:
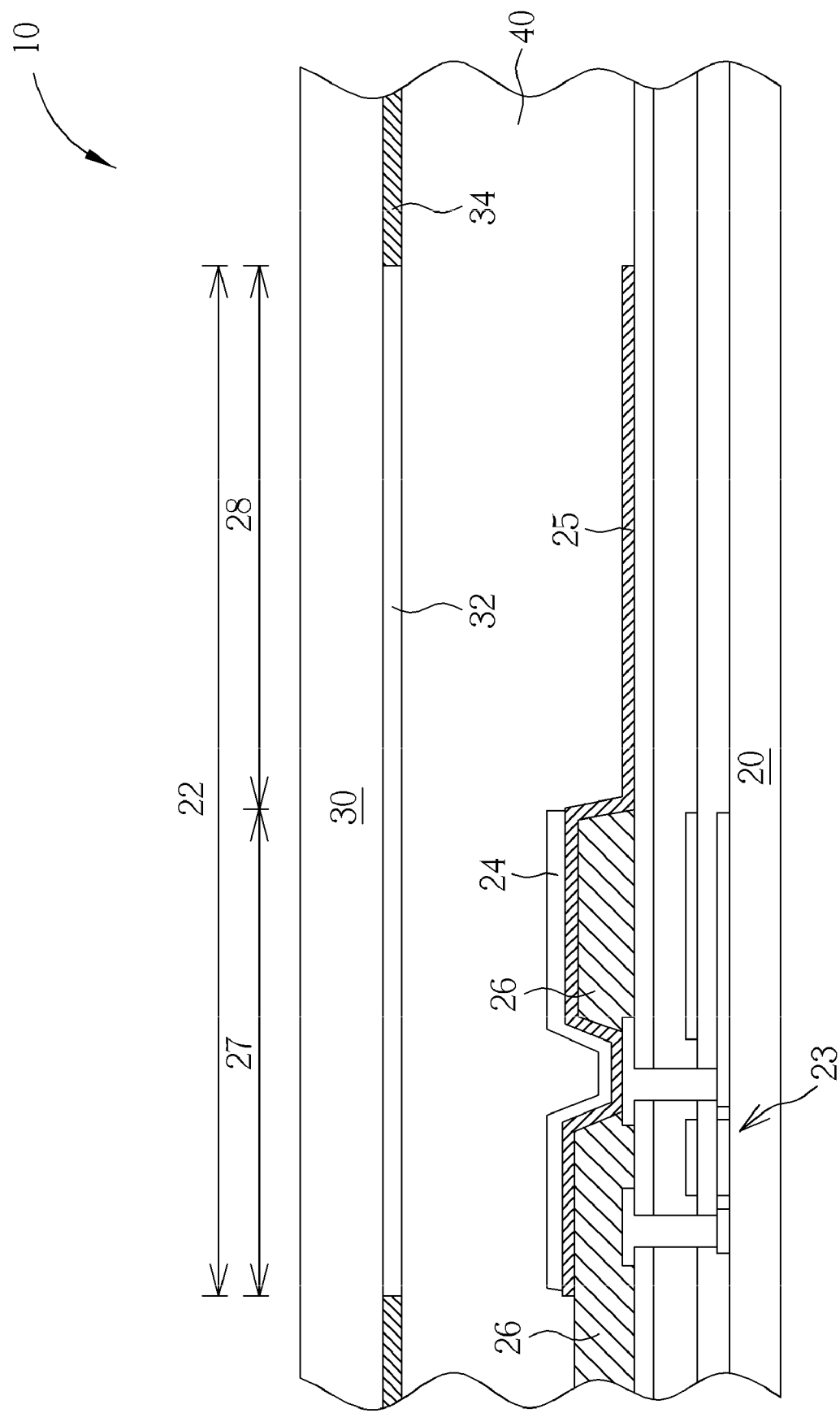
FIG. 1 is a schematic diagram of a traditional transflective LCD panel.
Figure 2A:
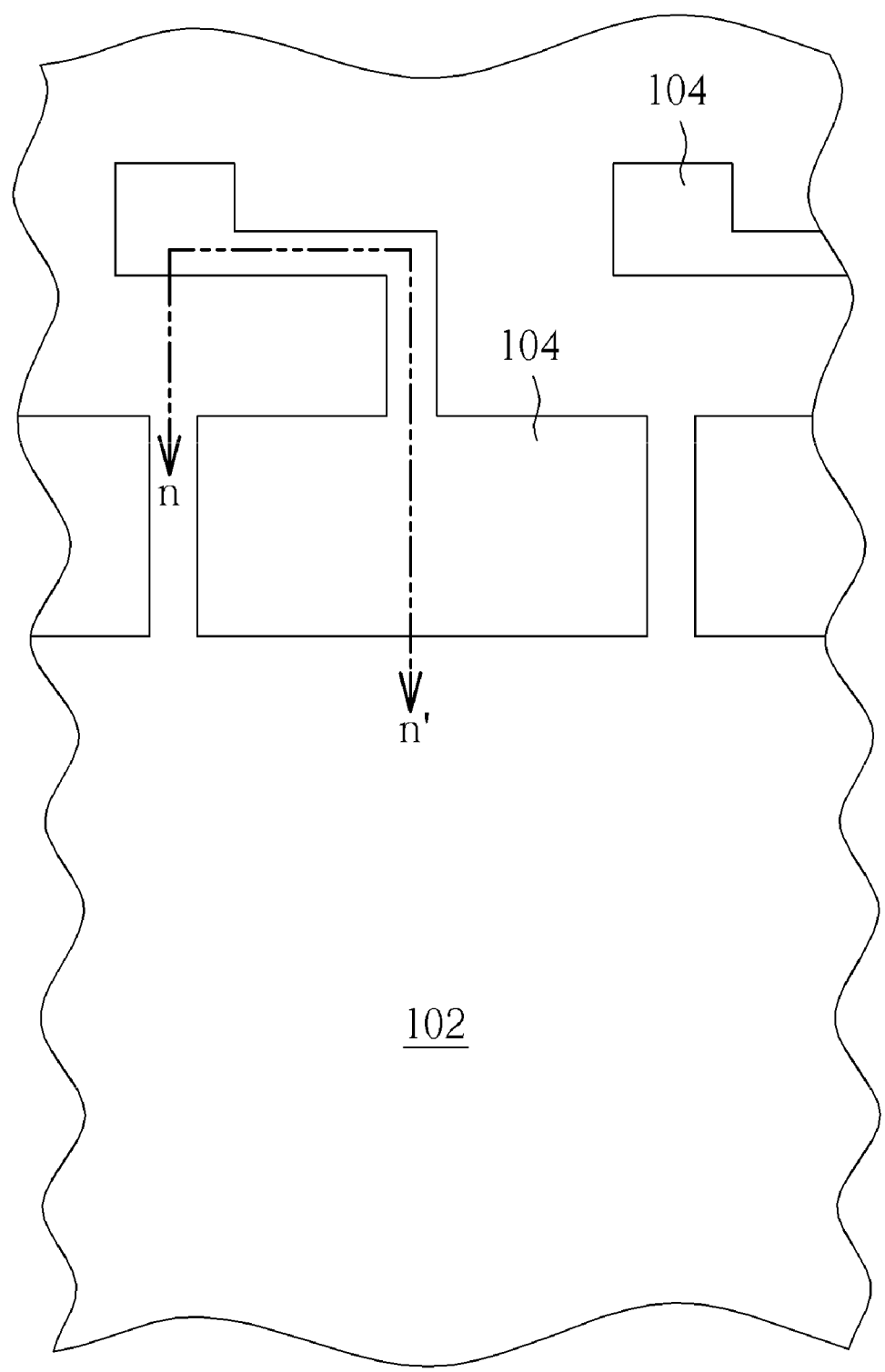
Figure 2B:
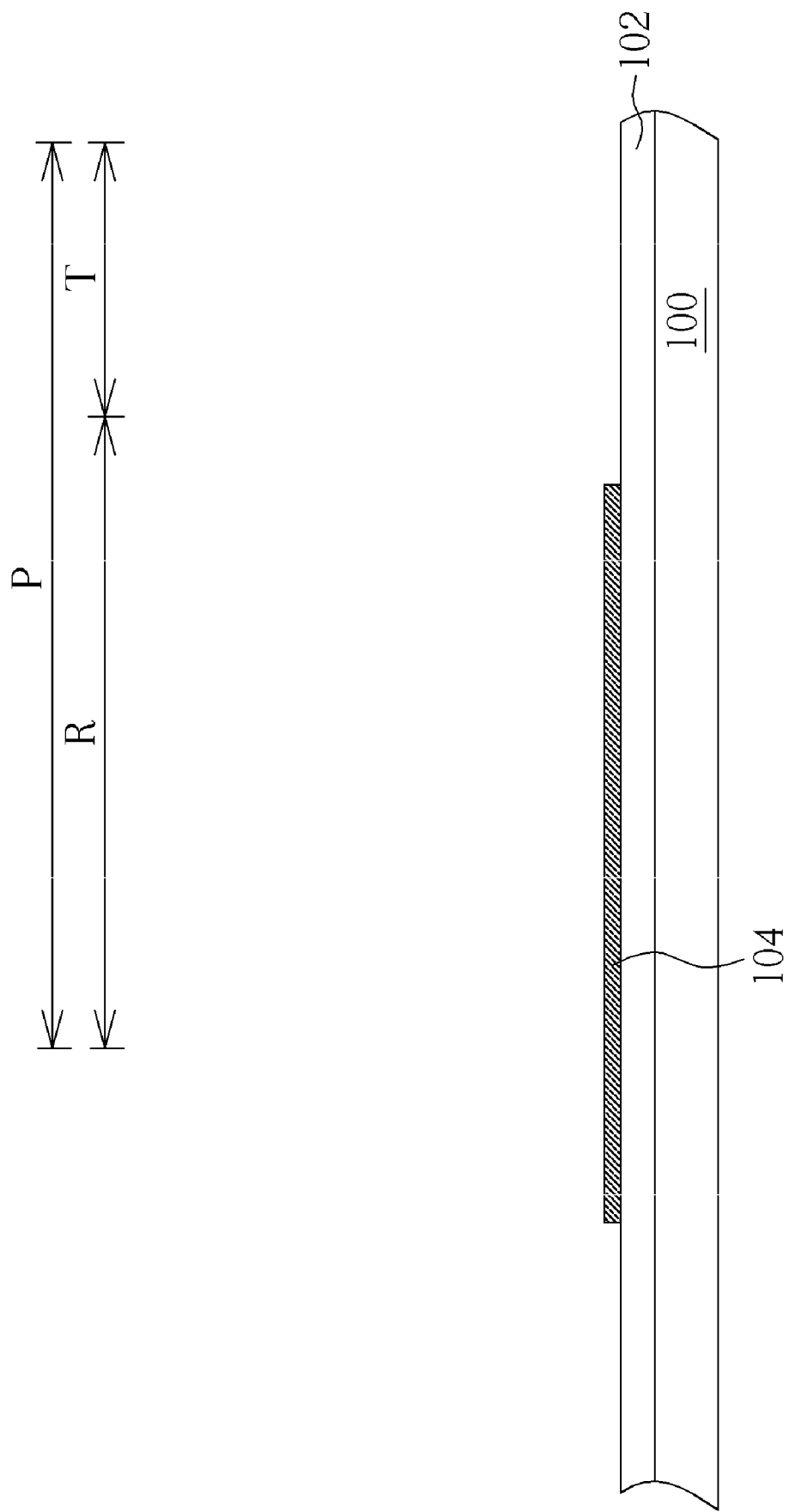

As shown in FIG. 2a and FIG. 2b, a substrate 100 is first provided. The substrate 100 has at least one pixel region P, and the pixel region P includes a reflective region R and a transmission region T. Substantially, a barrier layer 102 is formed on the substrate 100, and a patterned semiconductor layer 104 is formed on the barrier layer 102 to be an active layer.

The steps of forming the barrier layer 102 and the patterned semiconductor layer 104 may include depositing an inorganic dielectric layer and a poly-silicon film. The inorganic dielectric layer, such as a silicon oxide layer or a silicon nitride layer, is formed overall on the substrate 100 to be the barrier layer 102. Next, an amorphous silicon film is formed on the barrier layer 102 by a low-pressure chemical deposition (LPCVD) process or a plasma enhanced chemical vapor deposition (PECVD) process, and then the amorphous silicon film is crystallized to form the poly-silicon film. Thereafter, a photoresist layer (not shown in the drawings) is formed on the poly-silicon film, and a lithography process is performed to pattern the photoresist layer disposed on the poly-silicon film with utilizing a photo mask. Following that, the poly-silicon film is etched by utilizing the patterned photoresist layer as an etching mask to form the patterned semiconductor layer 104, and the patterned photoresist layer may next be removed.

Figure 3A:
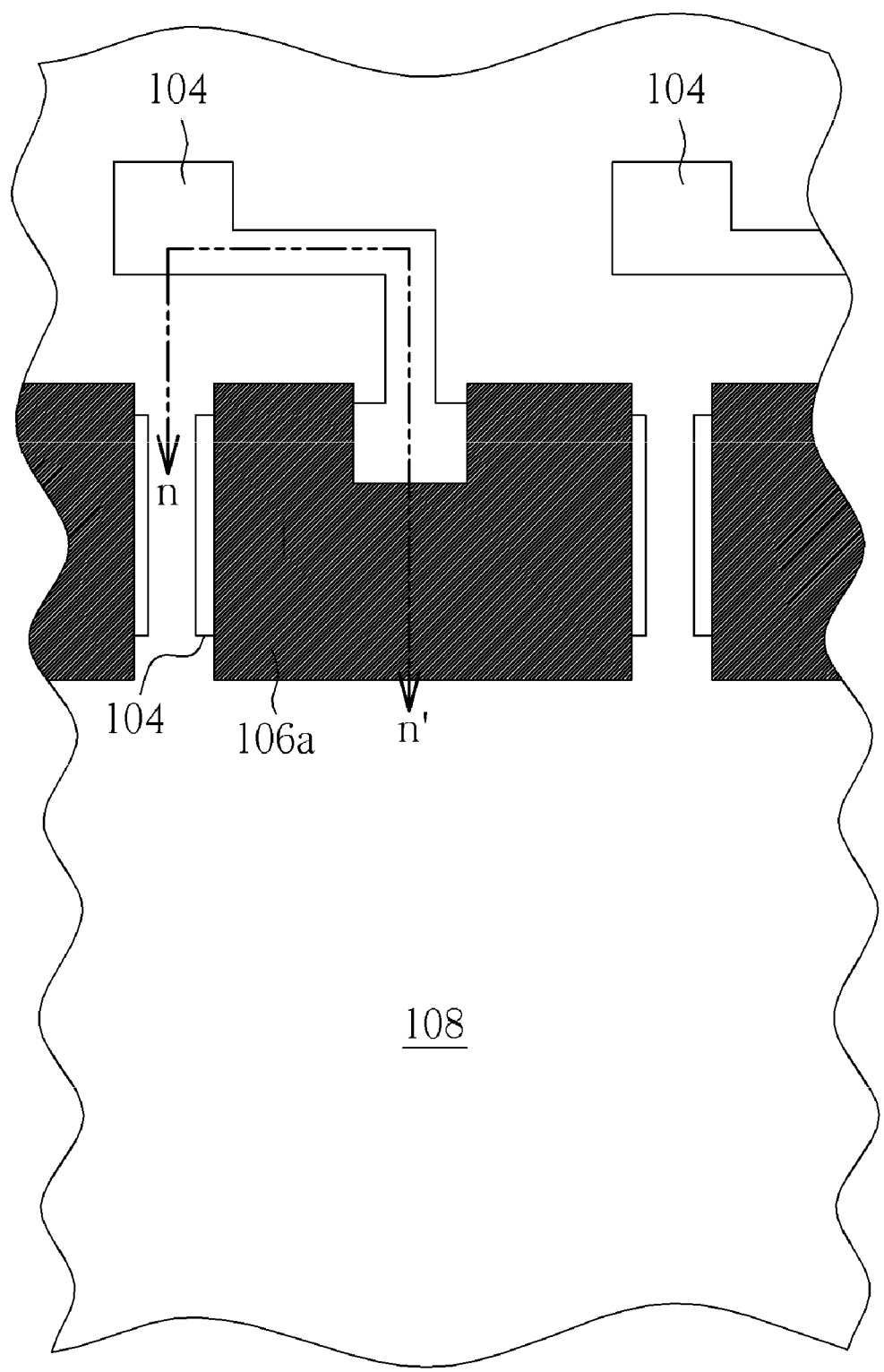
Figure 3B:
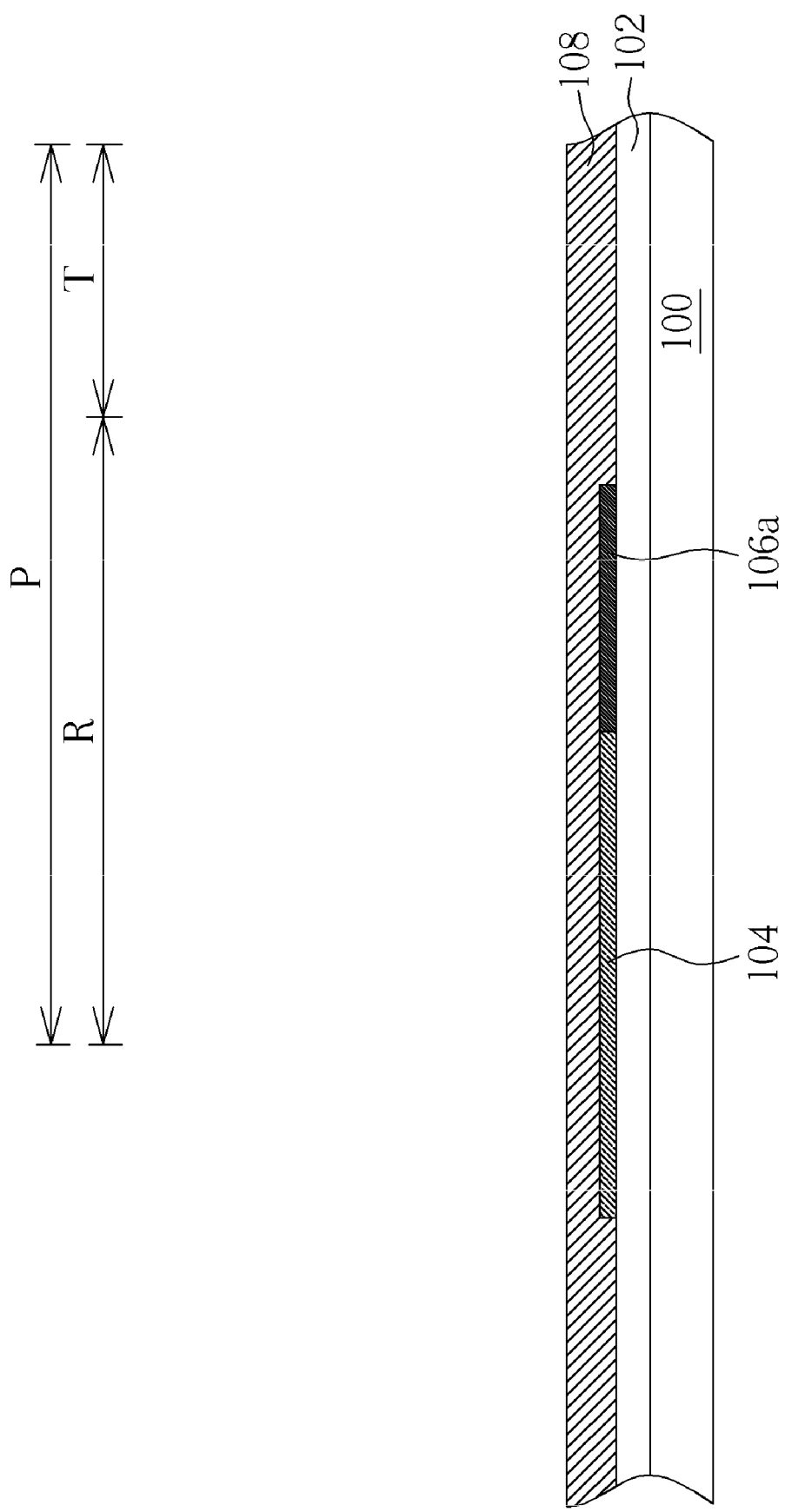

As shown in FIG. 3a and FIG. 3b, a first ion implantation process is performed on parts of the patterned semiconductor layer 104 by utilizing another photo mask process, so as to turn the parts of the patterned semiconductor layer 104 into at least one first doping region 106a, such as a P-type heavy doped region (P+ region). Afterward, a gate dielectric layer 108 is formed on the substrate 100 to cover the patterned semiconductor layer 104. In other embodiments, the performing sequence of the aforementioned two steps can be changed. For example, the gate dielectric layer 108 can first be formed on the substrate 100, and next the first doping region 106a is formed.

Figure 4A:
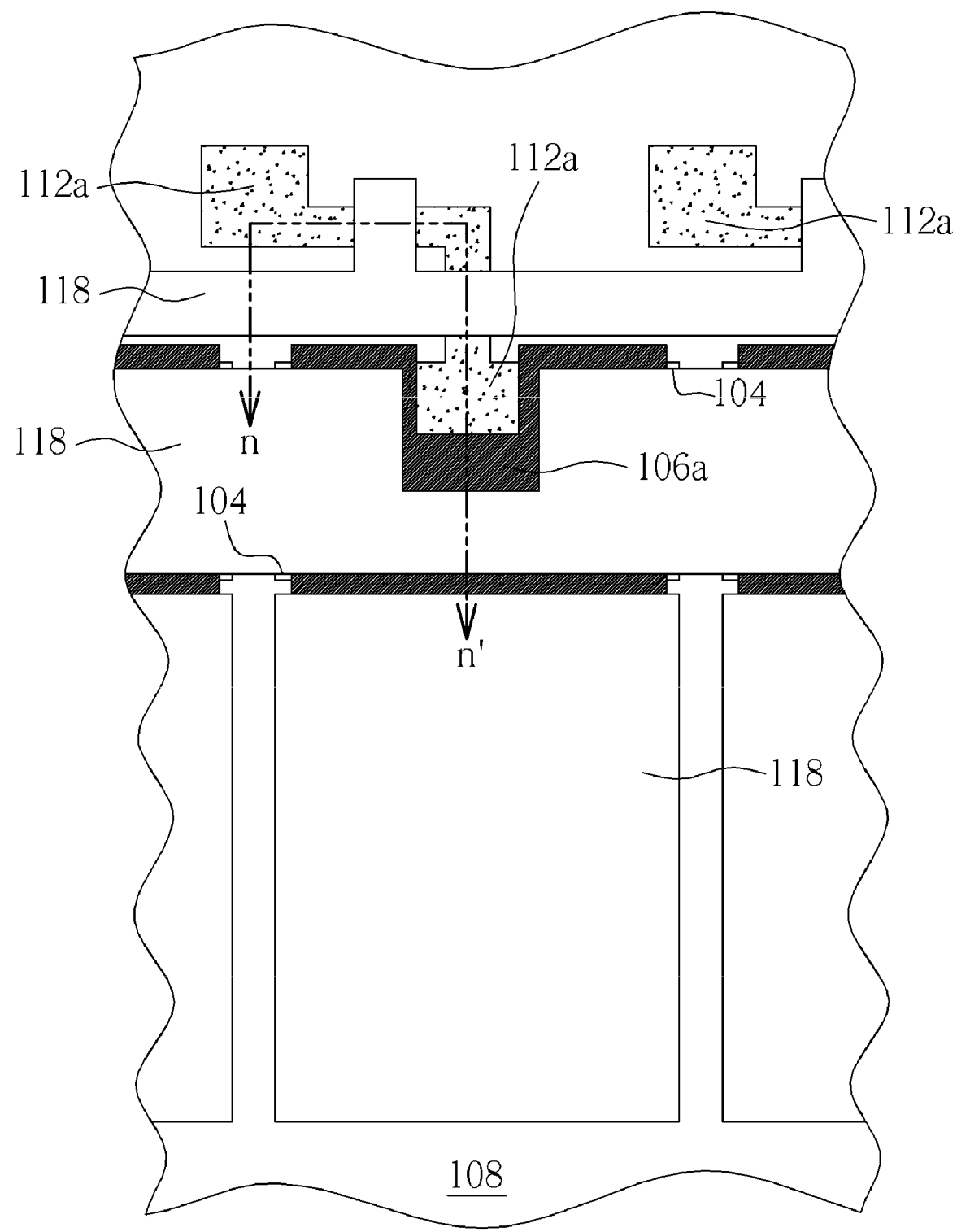
Figure 4B:
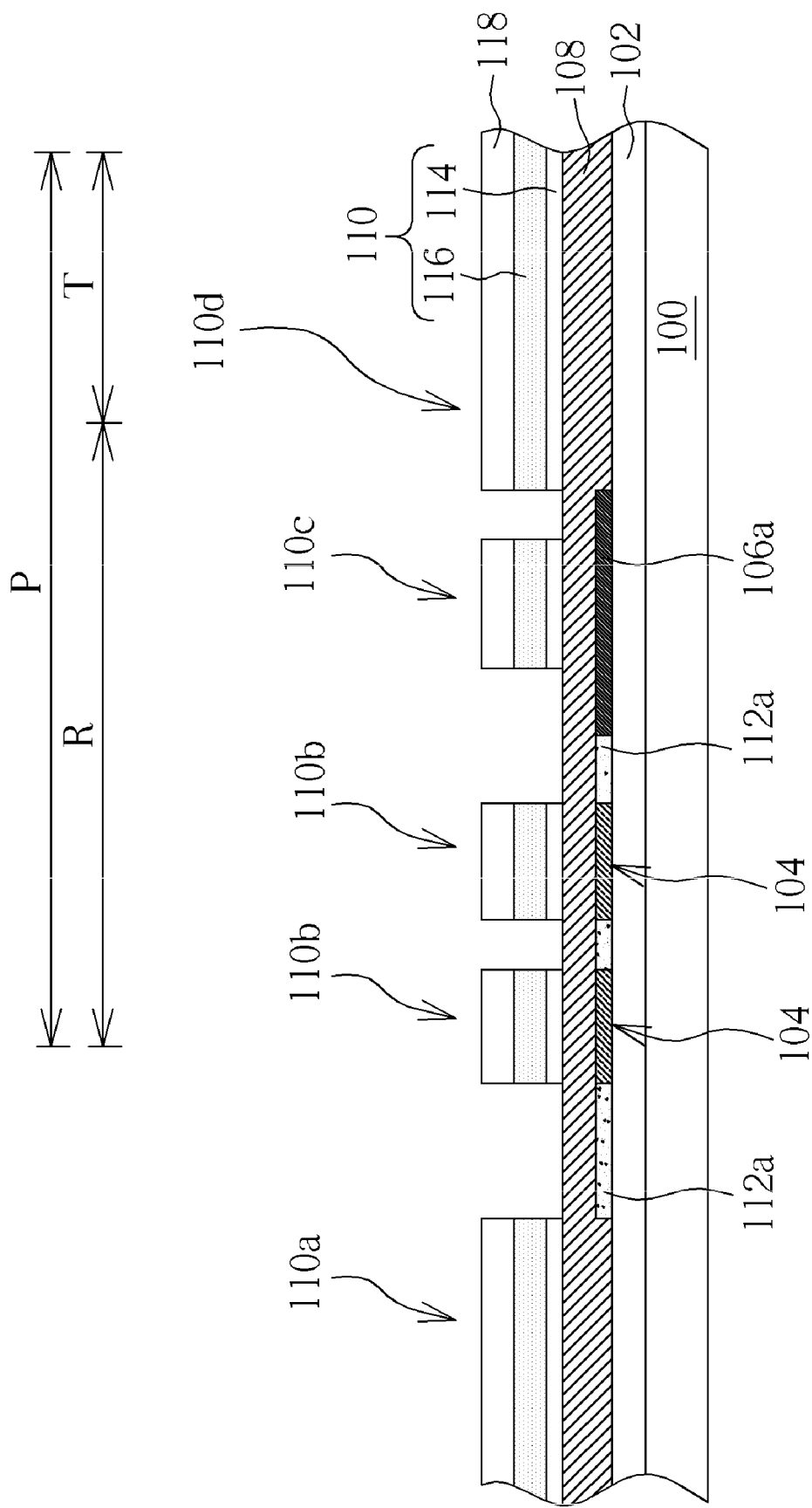

Furthermore, as shown in FIG. 4a and FIG. 4b, a first patterned conductive layer 110 is formed on the surface of the gate dielectric layer 108, and N-type heavy doped regions (N+ regions) are formed in the patterned semiconductor layer 104 to be the source regions/drain regions 112a (the source regions and the drain regions). The first patterned conductive layer 110 can consist of a transparent conductive layer 114 and a first metal layer 116 disposed on the transparent conductive layer 114 in this embodiment. The first patterned conductive layer 110 includes at least one gate line 110a, at least one gate electrode 110b, at least one common line 110c and at least one predetermined transparent pixel electrode 110d disposed in the transmission region T for example. The common line 110c can also function as a part of electrode of pixel capacitors.

The steps of forming the first patterned conductive layer 110 and the source regions/drain regions 112a may include depositing the transparent conductive layer 114, the first metal layer 116 and a photoresist layer 118 overall on the gate dielectric layer 108. Thereafter, a lithography process is performed by another photo mask to pattern the photoresist layer 118. Next, the transparent conductive layer 114 and the first metal layer 116 are etched by utilizing the patterned photoresist layer 118 as an etching mask. Afterward, a second ion implantation process is performed on parts of the patterned semiconductor layer 104 by utilizing the patterned photoresist layer 118 and the first patterned conductive layer 110 as a mask, so as to form the N+ regions in the patterned semiconductor layer 104 on two opposite sides of the gate electrode 110b respectively, as the source regions/drain regions 112a. Thus, a doping interface is formed between the source region/drain region 112a and the first doping region 106a.

Figure 5A:
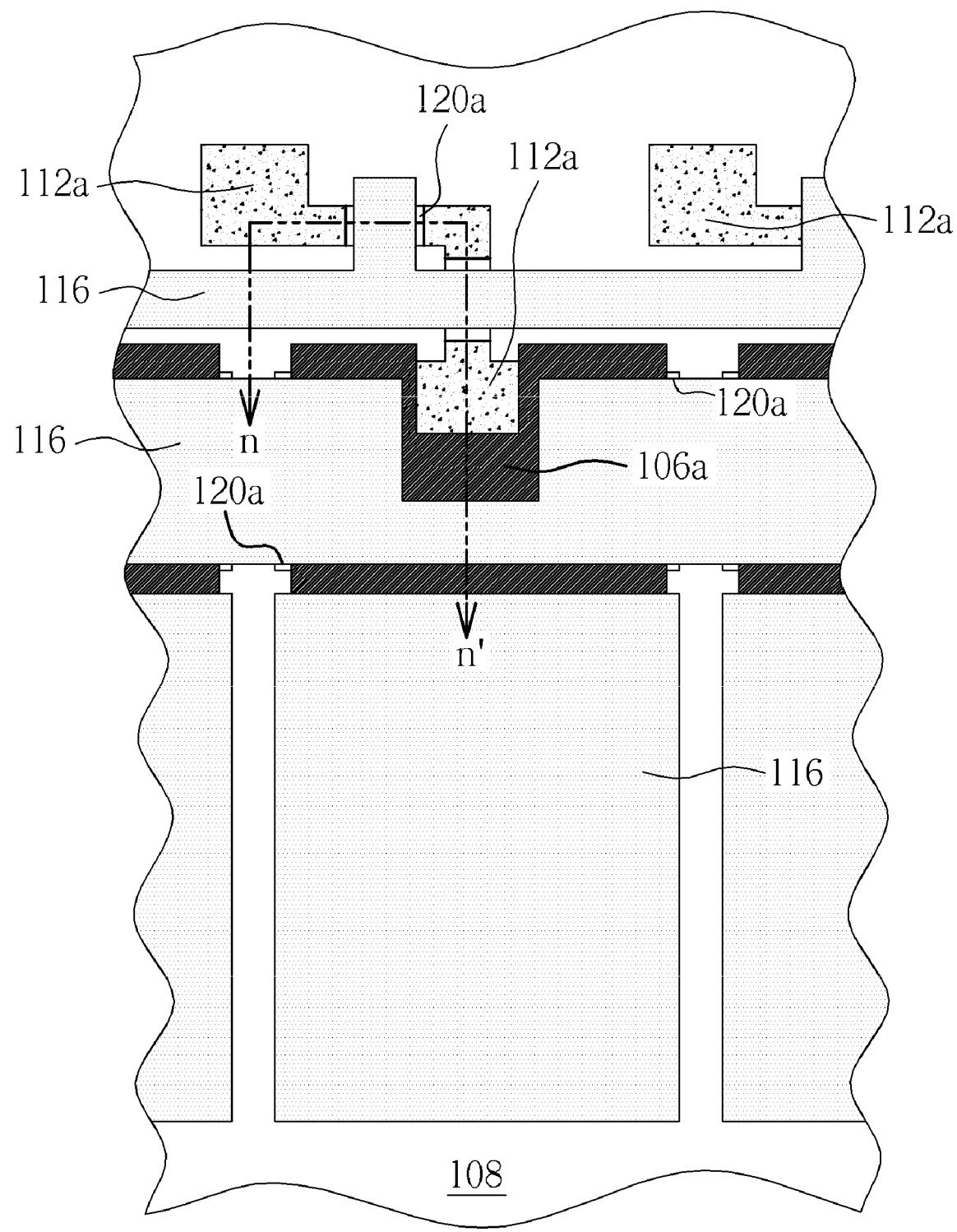
Figure 5B:
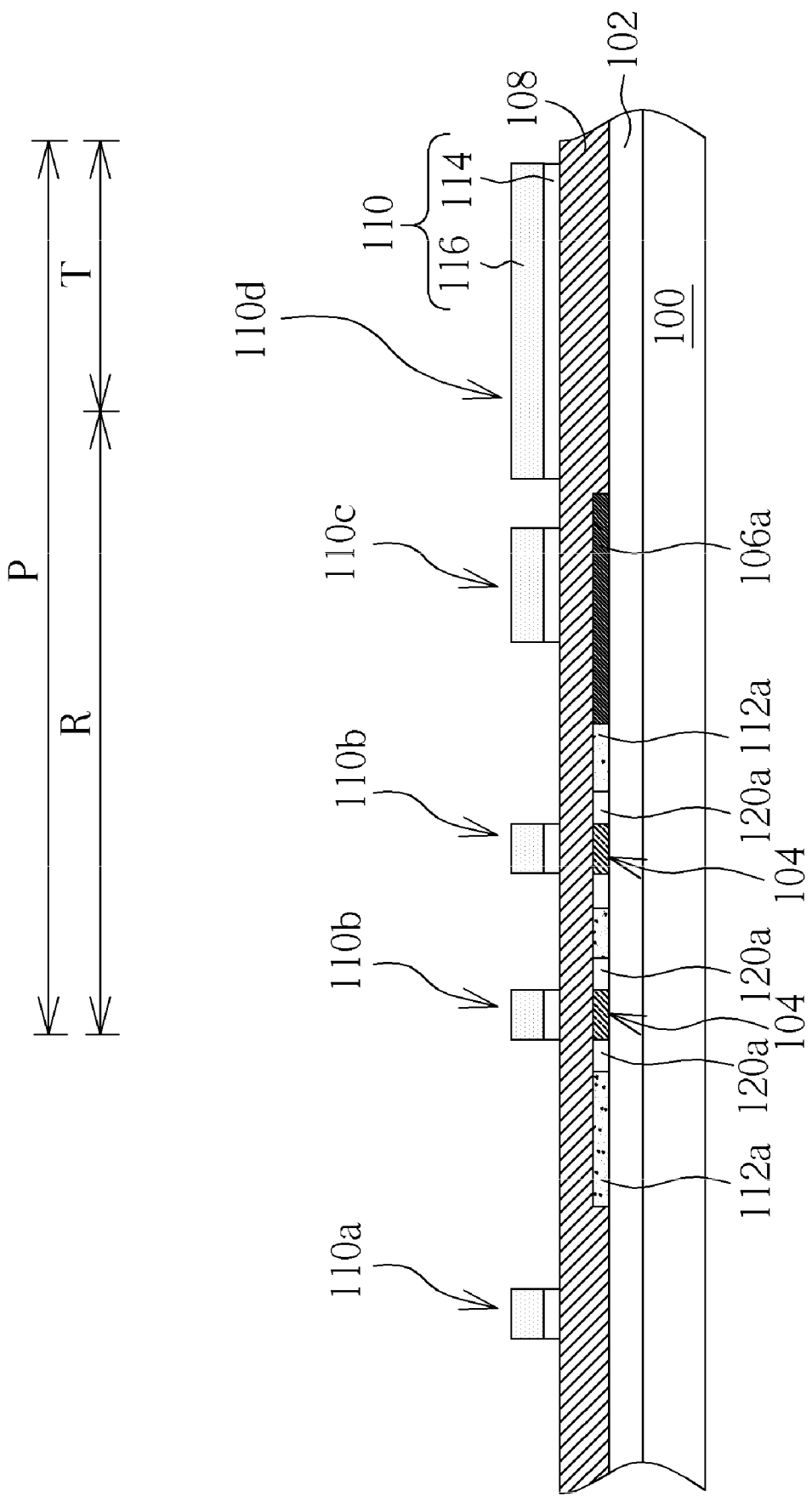

As shown in FIG. 5a and FIG. 5b, after forming the source regions/drain regions 112a, the first patterned conductive layer 110 can be further etched to remove parts of the gate electrode 110b and the gate line 110a. Furthermore, a third ion implantation process, which is a self-align process, is performed to form N-type lightly doped regions (N⁻ regions) adjacent to the source regions/drain regions 112a, and the N⁻ regions may be lightly doped source regions/drain regions 120a. Before depositing subsequent material layers, the patterned photoresist layer 118 can be removed to expose the first patterned conductive layer 110.

Figure 6A:
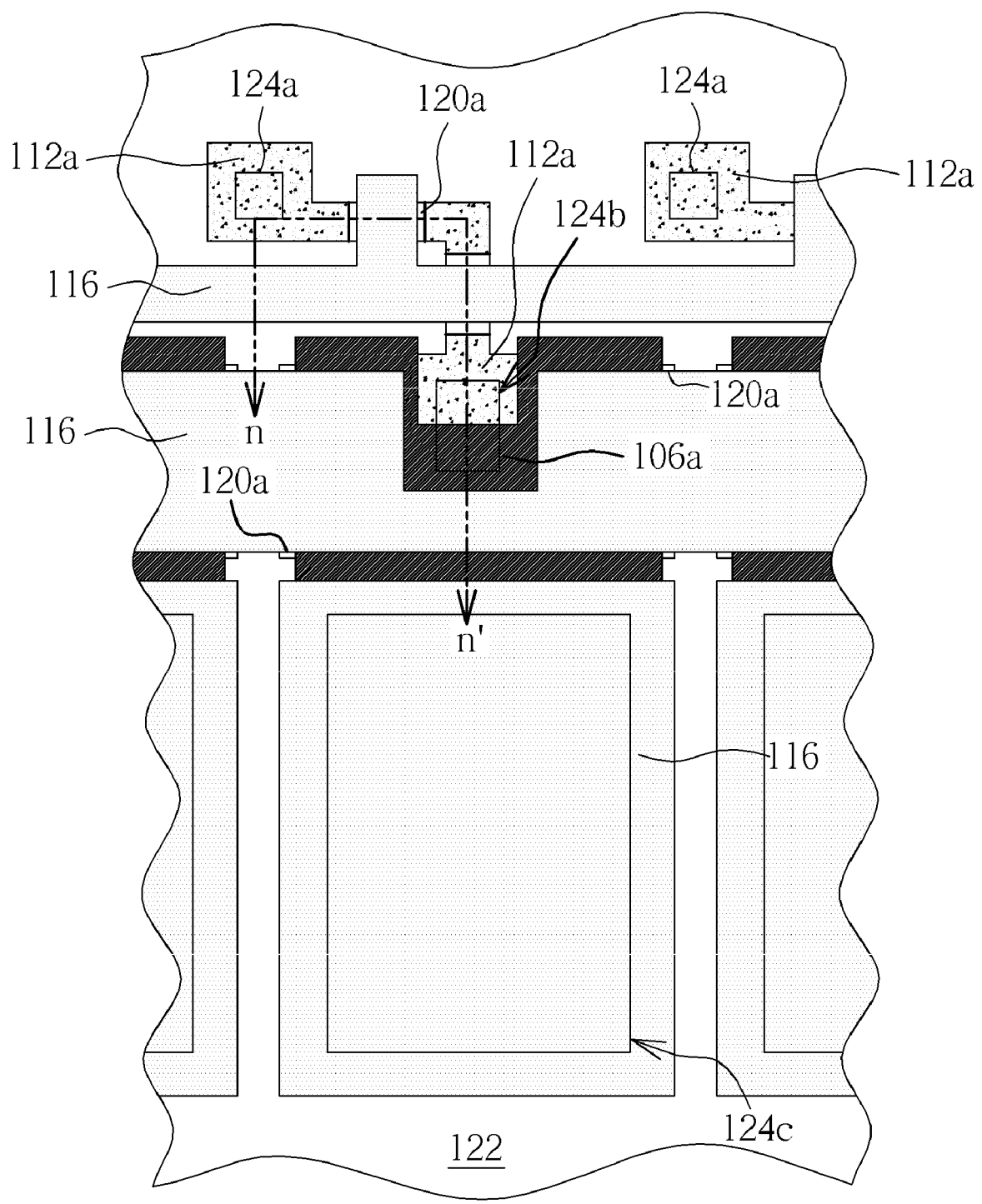
Figure 6B:
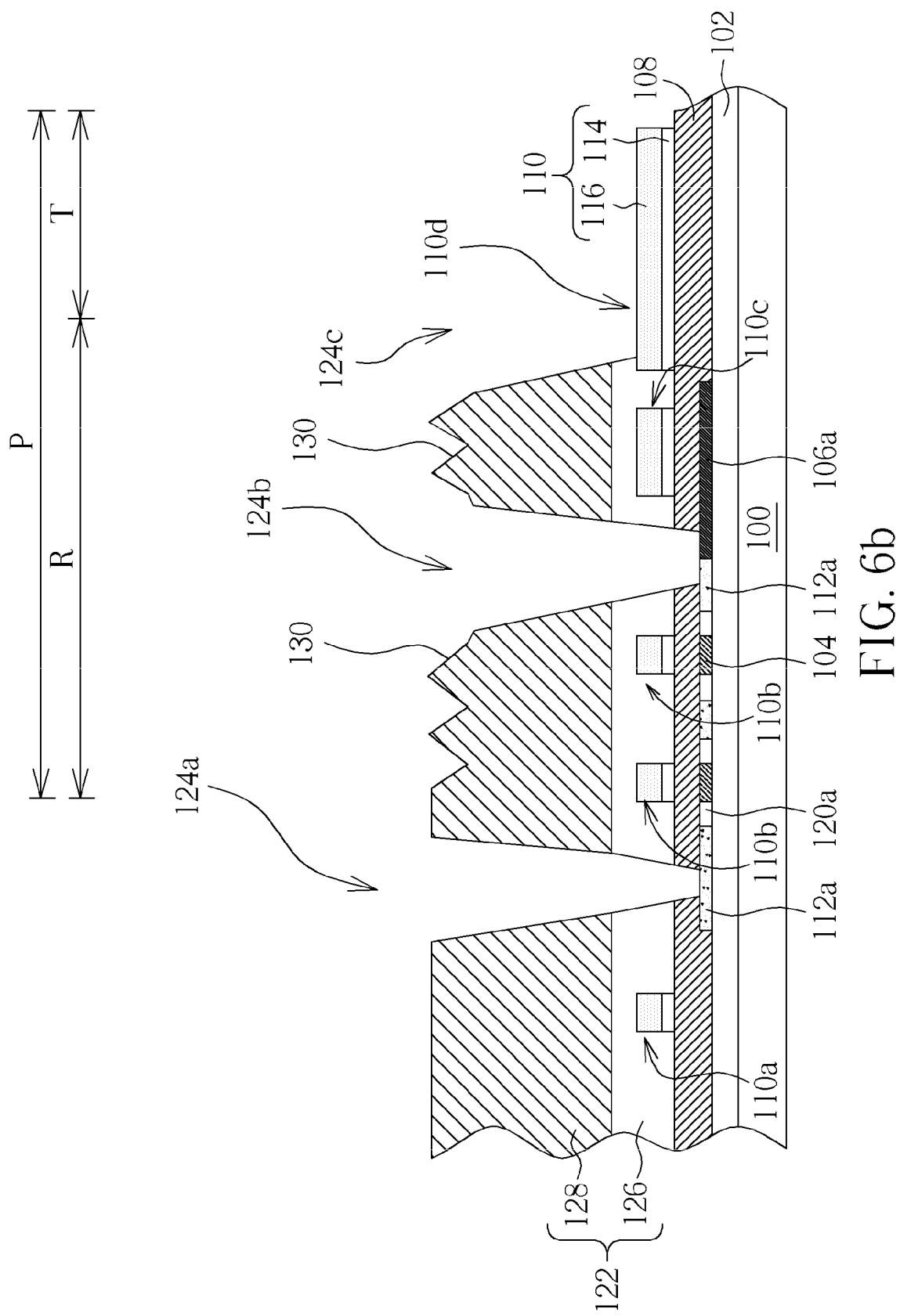

As shown in FIG. 6a and FIG. 6b, an ILD layer 122 is formed on the substrate 100. Next, parts of the ILD layer 122 are removed to form at least one contact hole 124a, the contact hole 124b and the transparent opening 124c in the ILD layer 122, so as to expose parts of the source regions/drain regions 112a, the doping interface disposed between the source region/drain region 112a and the first doping region 106a, parts of the first doping region 106a, and the first metal layer 116 of the predetermined transparent pixel electrode 110d.

The ILD layer 122 can include an inorganic dielectric layer 126 disposed on the first metal layer 116, and an organic dielectric layer 128 disposed on the inorganic dielectric layer 126. The inorganic dielectric layer 126 can include or consist of a silicon nitride compound, and the organic dielectric layer 128 can include or consist of a photosensitive material. After depositing the inorganic dielectric layer 126, a heating treatment can be performed on the substrate 100. The heating treatment can activate the dopants implanted by the ion implantation process, so to form bonds between the poly-silicon of the patterned semiconductor layer 104 and the dopants. On other hand, the hydrogen containing in the inorganic dielectric layer 126 can be diffused into the patterned semiconductor layer 104 by the heating treatment to repair defeats including incomplete chemical bonding formed in the patterned semiconductor layer 104. In addition, the inorganic dielectric layer 126 can further protect the first metal layer 116 from being directly exposed in the heating treatment.

In the reflective region R, the patterned ILD layer 122 preferably include a plurality of protruding structures 130 on its surface, so that the following-formed reflective electrode can have a rough surface to scatter light beams. For forming holes with different depths in the organic dielectric layer 128, the lithography process for patterning the organic dielectric layer 128 may use a photo mask that provides different transmittances in different regions, such as a gray mask, a halftone mask or a phase-shift mask the mask. Therefore, the holes penetrating through the organic dielectric layer 128, and the protruding structures 130 disposed on the surface of the organic dielectric layer 128 can be formed in one single lithography process. Afterward, an etching process is performed on the inorganic dielectric layer 126 by utilizing the organic dielectric layer 128 as an etching mask, so as to form the contact hole 124a, the contact hole 124b and the transparent opening 124c penetrating through the ILD layer 122 and the gate dielectric layer 108. The contact hole 124a can expose the source region/drain region 112a of the patterned semiconductor layer 104. The contact hole 124b can expose the doping interface disposed between the source region/drain region 112a and the first doping region 106a. The transparent opening 124c can expose the predetermined transparent pixel electrode 110d.

In order to form holes with different depths in the organic dielectric layer 128, the lithography process for patterning the organic dielectric layer 128 can use at least two photo masks in another embodiment. One of the said photo masks is used to define the pattern of the contact hole 124a, the contact hole 124b and the transparent opening 124c, and the other photo mask is used to define the pattern of the protruding structures 130 on the surface of the organic dielectric layer 128.

The etching process of forming the transparent opening 124c may stop on the surface of the first metal layer 116 of the predetermined transparent pixel electrode 110d, and does not expose the transparent conductive layer 114. In regarding to the material characteristics, if the first metal layer 116 in the transmission region T and the inorganic dielectric layer 126 in the reflective region R are removed in one single dry etching process, the source regions/drain regions 112a and the first doping region 106a underlying the contact hole 124a and the contact hole 124b are easily etched and damaged by the dry etching process; if the first metal layer 116 in the transmission region T and the inorganic dielectric layer 126 are removed by a wet etching process, an etchant for effectively etching metal is needed to prevent the source regions/drain regions 112a and the first doping region 106a from damage. However, the whole first metal layer 116 of the predetermined transparent pixel electrode 110d, which includes the portion covered by the inorganic dielectric layer 126, is therefore easily removed by the wet etching process. Since the etchant of the wet etching process has a slow etching rate to the dielectric layer, an undercut profile easily occur in the ILD layer 122 adjacent to metal materials, and affects the deposition and profile of the following-formed material layers. As a result, the first metal layer 116 of the present invention remains after the etching process of forming the contact holes to prevent the damages of source regions/drain regions 112a, the first doping region 106a and the first metal layer 116. In addition, since the first metal layer 116 in the transmission region T can be removed in the subsequent processes together with other metal layer, remaining of the first metal layer 116 can simplify the fabricating process.

Figure 7A:
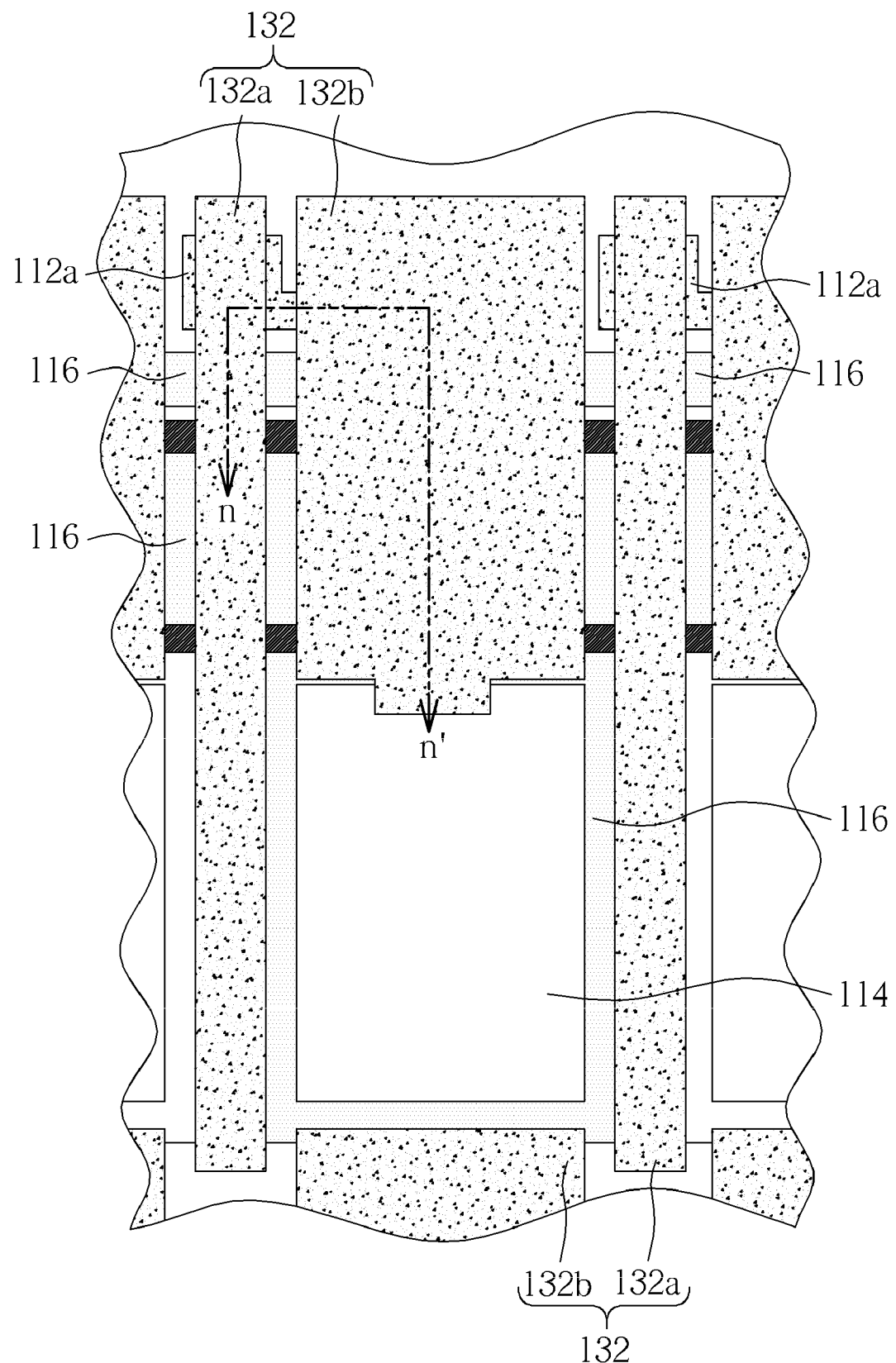
Figure 7B:
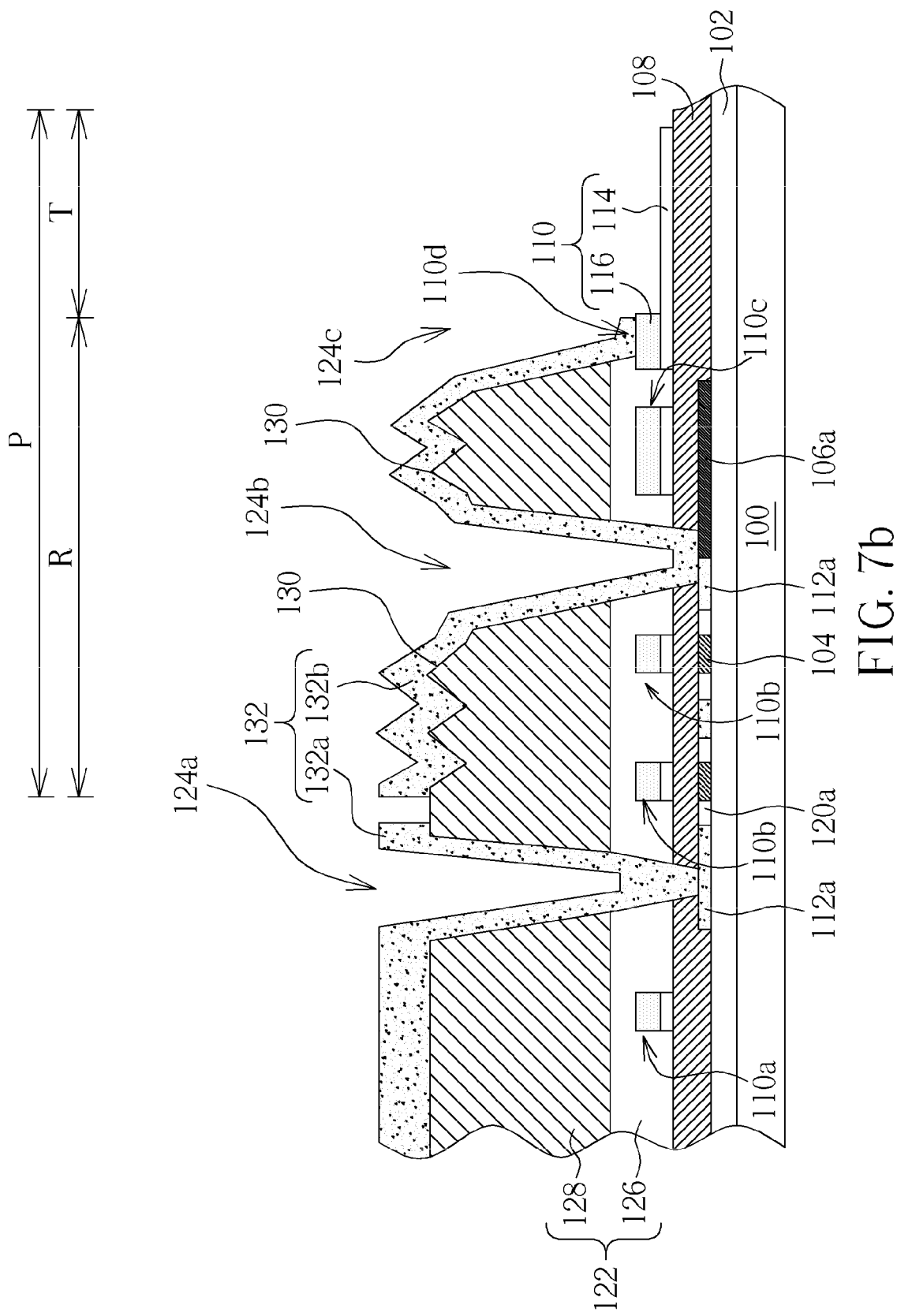

As shown in FIG. 7a and FIG. 7b, a second conductive layer 132, such as a metal layer, is overall formed on the substrate 100 to cover the ILD layer 122 and the exposed first metal layer 116, the exposed source regions/drain regions 112a and the exposed surface of the first doping region 106a. Thereafter, a photoresist layer (not shown in the drawings) is formed on the second conductive layer 132, and a lithography process is performed by a photo mask to pattern the photoresist layer disposed on the second conductive layer 132. Following that, an etching process is performed by utilizing the patterned photoresist layer as an etching mask to remove parts of the second conductive layer 132 and the first metal layer 116 in the transmission region T, and to expose the transparent conductive layer 114 of the predetermined transmission pixel electrode 110d. Next, the patterned photoresist layer may be removed. The patterned second conductive layer 132 can form at least one data line 132a and at least one reflective pixel electrode 132b, and the transparent conductive layer 114 of the transmission region T can form at least one transmission pixel electrode electrically connected to the reflective pixel electrode 132b. The reflective pixel electrode 132b can be disposed on the doping interface between the source region/drain region 112a and the first doping region 106a, and is electrically connected to the first metal layer 116 in the transmission region T and the source region/drain region 112a through the contact hole 124b and the transparent opening 124c. The data lines 132a can be electrically connected to the source region/drain region 112a through the contact hole 124a.

Since the protruding structures 130 are disposed on the surface of the patterned ILD layer 122, the reflective pixel electrode 132b covering the patterned ILD layer 122 can also have a rough surface to scatter light beams.

Figure 8A:
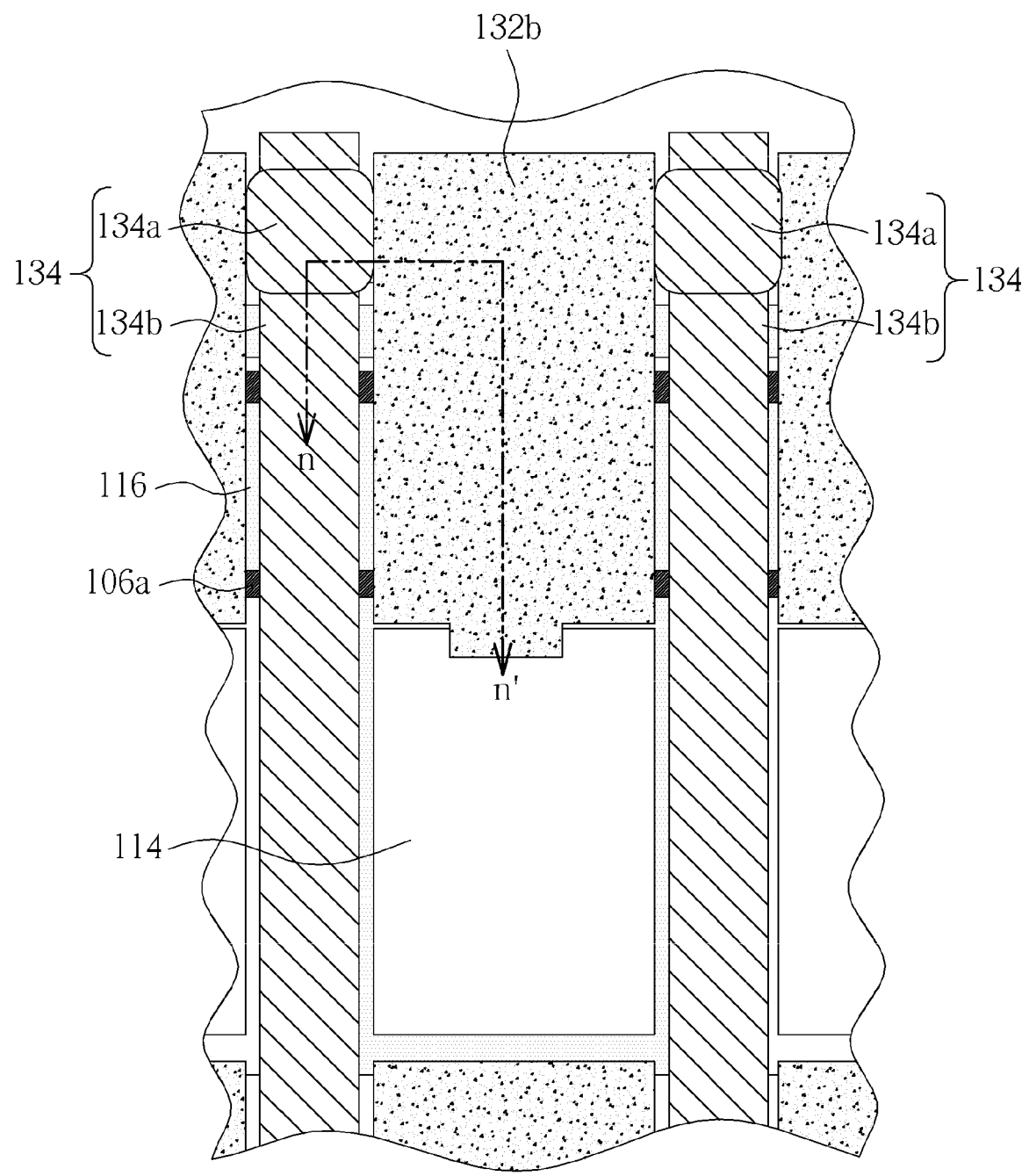
Figure 8B:
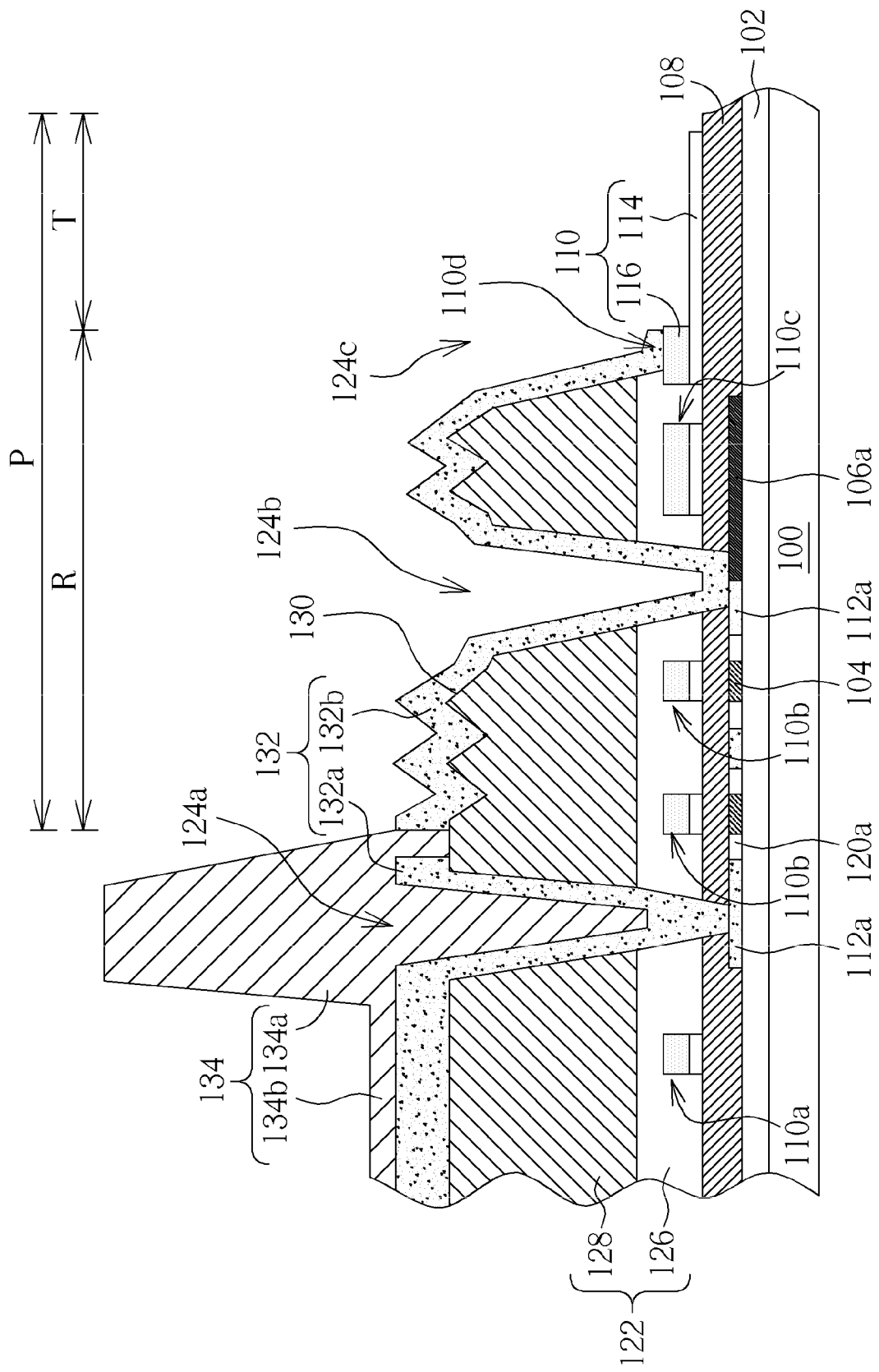

Afterward, the present invention can further include another photo mask process to form photoresist spacers. As shown in FIG. 8a and FIG. 8b, a patterned protection layer 134 is formed on the substrate 100. The patterned protection layer 134 includes at least one photoresist spacer 134a and at least one protection pad 134b to cover a periphery circuits region (not shown in the drawings) of the substrate 100 and the surface of the data lines 132a, and to expose the transmission region T and the reflective region R. The patterned protection layer 134 can include or consist of transparent materials or opaque materials. The photoresist spacer 134a can function as a support between the substrate 100 and a color filter substrate (not shown in the drawings). The position of the photoresist spacer 134a should not be limited to the data lines 132a, and can be disposed on any proper position on the substrate 100. The protection pad 134b can cover and protect the data lines 132a and the periphery circuits region of the substrate 100 to increase the product reliability.

The patterned protection layer 134 can include a photosensitive material. In order to form the patterned protection layer 134 having the thicker photoresist spacer 134a and the thinner protection pad 134b in one single lithography process, the lithography process for the patterned protection layer 134 may use a photo mask that provides different transmittances in different regions, such as a gray mask, a halftone mask or a phase-shift mask the mask. In other embodiments, the lithography process for the patterned protection layer 134 can use at least two photo masks. One the said photo masks is used to define the pattern of the photoresist spacer 134a, and the other mask is used to define the pattern of the protection pad 134b.

Figure 9:
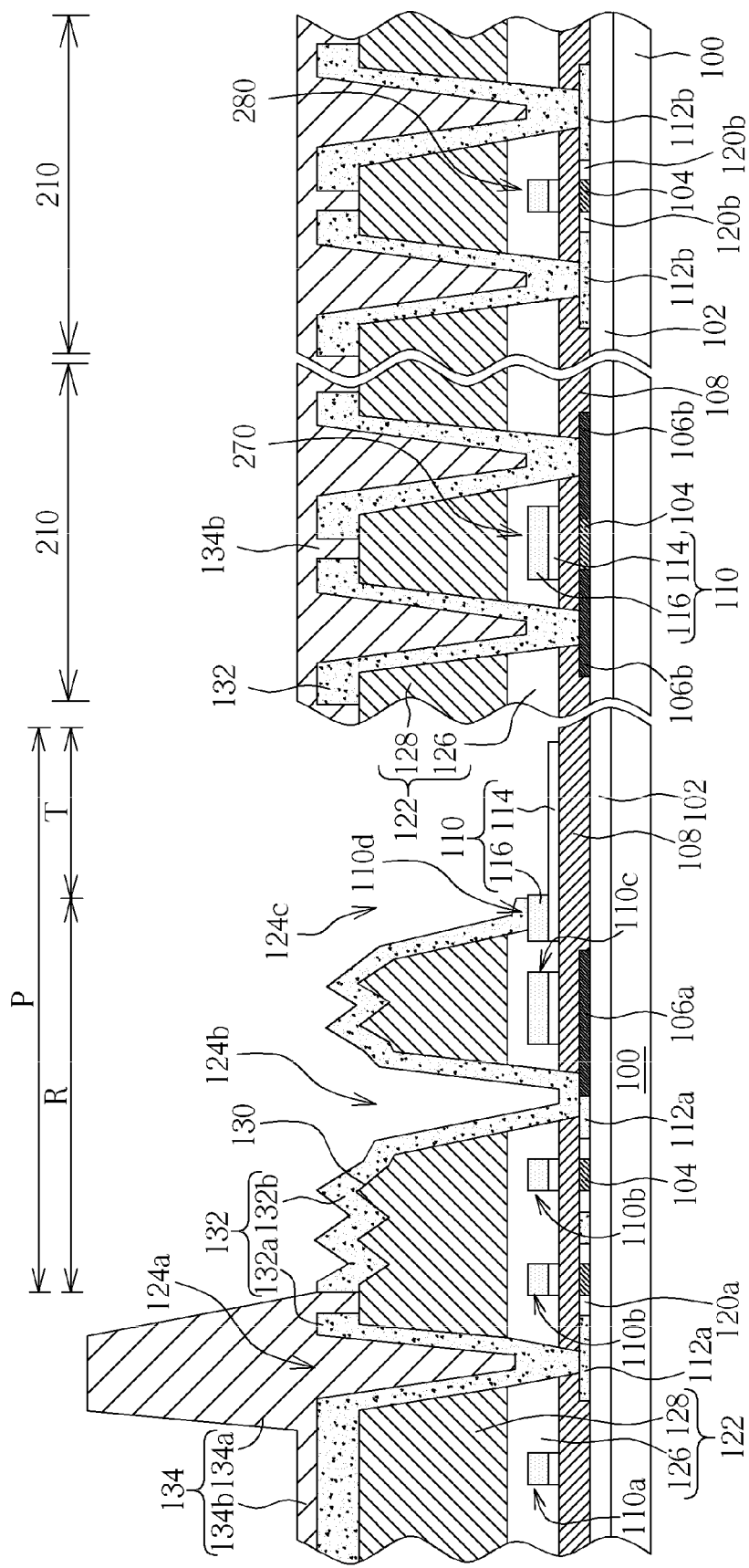
FIG. 9 is a schematic diagram illustrating a method of forming a pixel structure of a transflective LCD panel in accordance with another preferred embodiment of the present invention.

Please refer to FIG. 9, which is a schematic diagram illustrating a method of forming a pixel structure of a transflective LCD panel in accordance with another preferred embodiment of the present invention, where like numbered numerals designate similar or the same parts, regions or elements. In this embodiment, some elements or parts of devices in the periphery circuits region of the substrate 100 can be formed by the processes and the photo masks that are used to form the aforementioned pixel structure. As shown in FIG. 9, the periphery circuits region 210 of the transflective LCD device includes at least one P-type metal-oxide-semiconductor thin film transistor (PMOS TFT) 270 and at least one N-type metal-oxide-semiconductor thin film transistor (NMOS TFT) 280, and the pixel region P of the transflective LCD device includes the similar pixel structure formed in the above-mentioned embodiment.

In this embodiment, the substrate 100 and the barrier layer 102 are disposed in both the periphery circuits region 210 and the pixel region P, and the patterned semiconductor layer 104 is formed in both the periphery circuits region 210 and the pixel region P. The source regions/drain regions 106b of the PMOS TFT and the first doping region 106a of the pixel region P can be doped in the same ion implantation process, and the source region/drain region 112b of the NMOS TFT and the source regions/drain regions 112a of the pixel region P can be doped in the same ion implantation process. In addition, the lightly doped source region/drain region 120b of the NMOS TFT and the lightly doped source regions/drain regions 120a of the pixel region P can be doped in the same ion implantation process.

According to the forming method of the present invention, pixel structures of a transflective liquid crystal display device can be formed through five mask processes. Therefore, the manufacturing process of the transflective liquid crystal display device is effectively simplified, so the product yield is improved and the cost can be reduced. Some advantages and benefits of the present invention but not limited thereto are sown as following.

(1) The first metal layer and the transparent conductive layer are patterned in one photo mask process by one single photo mask, so the gate line, the gate electrode, the common line of pixel capacitor, and the predetermined transparent pixel electrode are formed in one photo mask process.

(2) The second conductive layer can directly connected to the source regions/drain regions, the first doping region and the first metal layer of the predetermined transparent pixel electrode, and also function as the reflective pixel electrode, so the present invention can effectively simplify the processes of forming the pixel structure.

(3) The present invention can further include sixth photo mask process to form both photoresist spacers to support between substrates, and protection pads to protect the second conductive layer.

(4) Since the ILD layer included both the inorganic dielectric layer and the organic dielectric layer, the present invention can decrease the coupling effect in the regions, where the conductive lines, wires or traces cross or overlap each other. Therefore, the capacitance between pixel and data line (Cpd) can be reduced.

(5) The contact hole of the present invention can expose both the source region/drain region and the first doping region, so the number of contact holes in the pixel region can be decreases, and the aperture ratio can be increased.

(6) The second conductive layer in the contact hole can electrically connect to both the source regions/drain regions and the first doping region, so to ensure the source regions/drain regions and the first doping region connecting to the same voltage. As a result, the present invention can prevent a P-N junction between the source regions/drain regions and the first doping region.

Those skilled in the art will readily observe that numerous modifications and alterations of the device and method may be made while retaining the teachings of the invention.

What is claimed is:

1. A method for forming a pixel structure of a transflective liquid crystal display device, the pixel structure being formed on a substrate, the substrate having a pixel region, and the pixel region comprising a reflective region and a transmission region, the method comprising:

forming a patterned semiconductor layer on the substrate;

performing a first ion implantation process on parts of the patterned semiconductor layer to form a first doping region in the patterned semiconductor layer;

forming a dielectric layer covering the patterned semiconductor layer on the substrate;

forming a first patterned conductive layer on a surface of the dielectric layer, the first patterned conductive layer consisting of a transparent conductive layer and a first metal layer disposed on the transparent conductive layer, the first patterned conductive layer comprising a gate line, at least one gate electrode, a common line and a predetermined transparent pixel electrode structure disposed in the transmission region;

performing a second ion implantation process on the patterned semiconductor layer to form a source region and a drain region on two opposite sides of the gate electrode respectively, and to form a doping interface between the drain region and the first doping region;

forming an inter-layer dielectric (ILD) layer on the substrate;

removing parts of the ILD layer to expose parts of the source region, the doping interface and the first metal layer of the predetermined transparent pixel electrode structure;

forming a second conductive layer on the substrate to cover the ILD layer and to expose a surface of the first metal layer; and performing an etching process to remove parts of the second conductive layer and parts of the first metal layer in the transmission region simultaneously to form a data line and a reflective pixel electrode, to expose the transparent conductive layer of the predetermined transparent pixel electrode structure, and to form a transmission pixel electrode electrically connected to the reflective pixel electrode.

2. The method of claim 1, further comprising a step of forming a patterned protection layer on the substrate, wherein the patterned protection layer covers the data line and exposes the transmission region and the reflective region.

3. The method of claim 2, wherein the patterned protection layer further covers a periphery circuits region disposed on a surface of the substrate.

4. The method of claim 2, wherein the patterned protection layer comprises at least one photoresist spacer.

5. The method of claim 4, wherein the patterned protection layer comprises a protection pad covering the data line.

6. The method of claim 2, wherein the patterned protection layer is formed by use of two photo mask or a half-tone mask.

7. The method of claim 2, wherein the patterned protection layer comprises a photosensitive material.

8. The method of claim 1, wherein the reflective pixel electrode is disposed on a surface of the doping interface and electrically connects the drain region and the first doping region.

9. The method of claim 1, wherein the ILD layer comprises an inorganic dielectric layer disposed on the substrate and an organic dielectric layer disposed on the inorganic dielectric layer.

10. The method of claim 9, wherein the ILD layer, which is patterned, comprises a plurality of protruding structures disposed in the reflective region.

11. The method of claim 9, wherein the organic dielectric layer comprises a photosensitive material, and the step of removing the parts of the ILD layer comprises performing a lithography process on the organic dielectric layer.

12. The method of claim 1, wherein the first doping region comprises a P-type heavy doped region ($P^+$ region), and the source region and the drain region comprise an N-type heavy doped region ($N^+$ region).

13. The method of claim 1, wherein before forming the ILD layer, the method further comprises:
  removing parts of the first patterned conductive layer after forming the source region and the drain region; and
  performing a third ion implantation process to form a lightly doped source region and a lightly doped drain region on one side of the source region and on one side of the drain region respectively.

14. The method of claim 13, wherein the step of removing parts of the first patterned conductive layer comprises removing parts of the gate electrode and parts of the gate line.

15. The method of claim 1, wherein the second conductive layer comprises a second metal layer.

16. The method of claim 1, wherein the first patterned conductive layer comprises two gate electrodes disposed in the pixel region.

\* \* \* \* \*

UNITED STATES PATENT AND TRADEMARK OFFICE
CERTIFICATE OF CORRECTION

PATENT NO.         : 7,745,243 B2                                                              Page 1 of 1
APPLICATION NO.  : 12/416934
DATED                  : June 29, 2010
INVENTOR(S)         : Yu-Cheng Chen et al.

It is certified that error appears in the above-identified patent and that said Letters Patent is hereby corrected as shown below:

On the title page, item (54), and column 1, line 1: correct the invention title from "METHOD FOR FORMING PIXEL STRUCTURE OF TRANSFLECTIVE LIQUID CRYSTAL DISPLAY" to -- METHOD FOR FORMING PIXEL STRUCTURE OF TRANSFLECTIVE LIQUID CRYSTAL DISPLAY DEVICE --.

Signed and Sealed this

Twenty-first Day of September, 2010

David J. Kappos
*Director of the United States Patent and Trademark Office*